United States Patent [19]

Su

[11] Patent Number: 4,738,245

[45] Date of Patent: Apr. 19, 1988

[54] STEAMING CASE

[76] Inventor: Huei S. Su, No. 315, Lan Chang Road, Nantzu District Kaohsiung, Taiwan

[21] Appl. No.: 98,404

[22] Filed: Sep. 18, 1987

[51] Int. Cl.⁴ ............................................. A47J 27/04
[52] U.S. Cl. ......................................... 126/369; 99/417
[58] Field of Search .............. 126/369, 369.1; 99/417, 99/403, 410–418, 447

[56] References Cited

U.S. PATENT DOCUMENTS 4,649,811  3/1987  Manganese ........................ 126/369
4,702,160  10/1987  Manganese ........................ 126/369

Primary Examiner—Henry A. Bennet
Attorney, Agent, or Firm—Morton J. Rosenberg

[57] ABSTRACT

This invention relates to an improved steaming case and in particular to one including a metal case having a room therein for receiving a plurality of laminas, an open-top water tank disposed at lower part of the case and a gas cooker mounted below the water tank for heating the water therein whereby the heat of the waste gas may be recovered and fully utilized and the water in the water tank will be automatically maintained at a predetermined level.

1 Claim, 4 Drawing Sheets

B-B VIEW

STEAMING CASE

BACKGROUND OF THE INVENTION

It has been found to use a steaming case to prepare food. However, the conventional steaming case is energy-consuming and has very low heat efficiency. It is, therefore, an object of the present invention to provide a steaming case which may obviate and mitigate the above-mentioned drawbacks.

SUMMARY OF THE INVENTION

This invention relates to an improved steaming case.

It is the primary object of the present invention to provide a steam case which can fully utilize the heat generated by the gas cooker.

It is another object of the present invention to provide a steam case which is energy-saving.

It is still another object of the present invention to provide a steam case which is simple in construction.

It is still another object of the present invention to provide a steam case which is economic to produce.

It is a further object of the present invention to provide a steam case which is easy to manufactune.

Other objects and merits and a fuller understanding of the present invention will be obtained by those having ordinary skill in the art when the following detailed description of the preferred embodiment has been read in conjunction with the accompanying drawings wherein like numerals refer to like or similar parts and in which:

Figure 1:
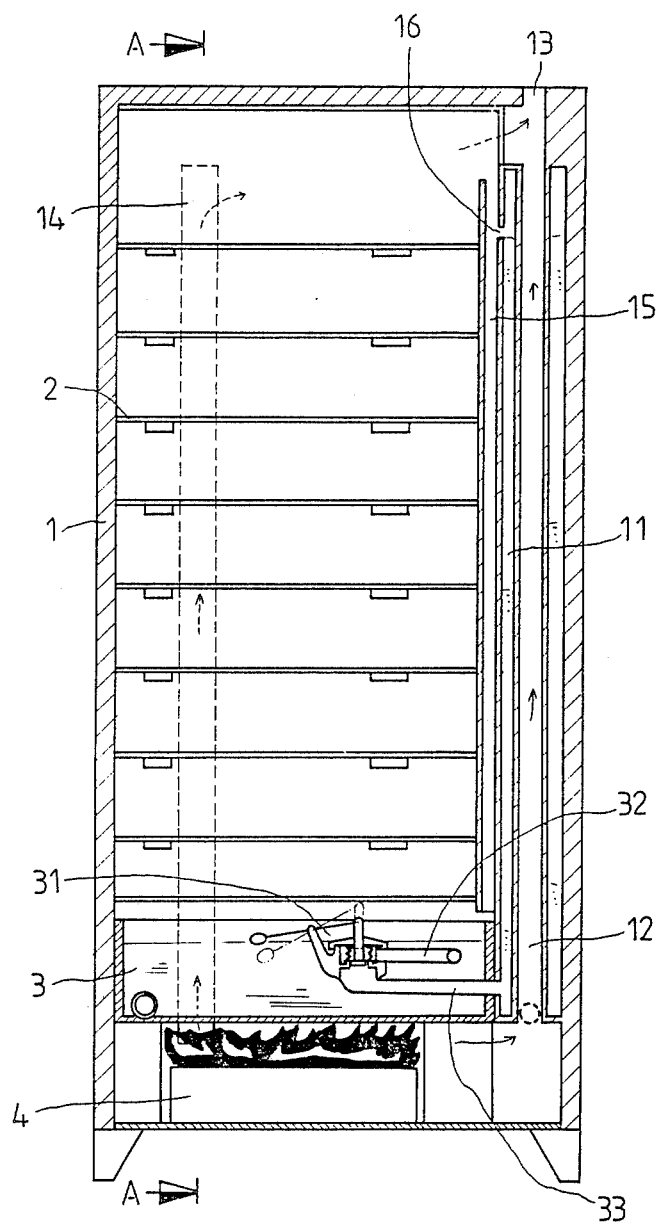
FIG. 1 is a front elevational sectional view of a steaming case according to the present invention.

With reference to the drawings, the steaming case according to the present invention comprises a metal case 1 having a room in its interior and a number of racks for engaging various laminas 2 at its both sides. The lamina 2 is used to receive foods to be baked or fermented. Each lamina is formed with a plurality of steaming holes 21. When the water tank 3 is heated by a gas cooker 4 to generate steam, the steam will pass upwardly through the steaming holes 21 to cook the foods on the laminas 2.

Figure 2:
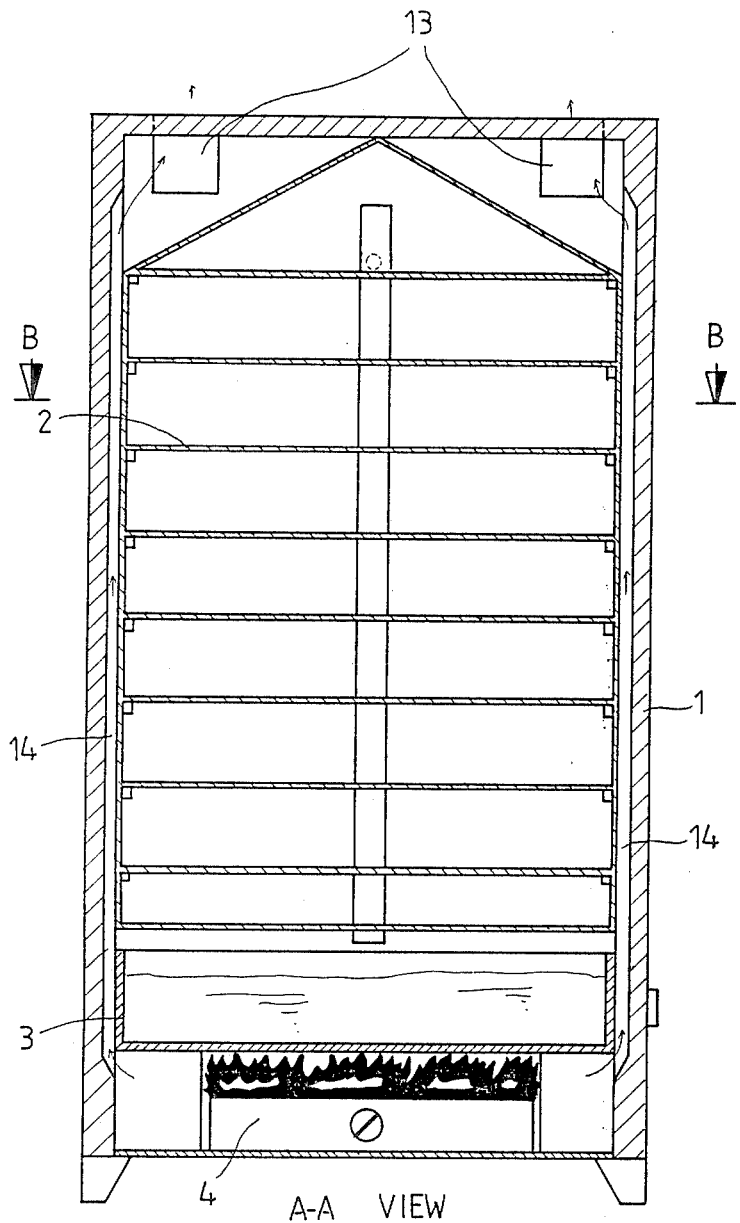
FIG. 2 is a side elevational sectional view of the steaming case taken along line A—A of FIG. 1
Figure 3:
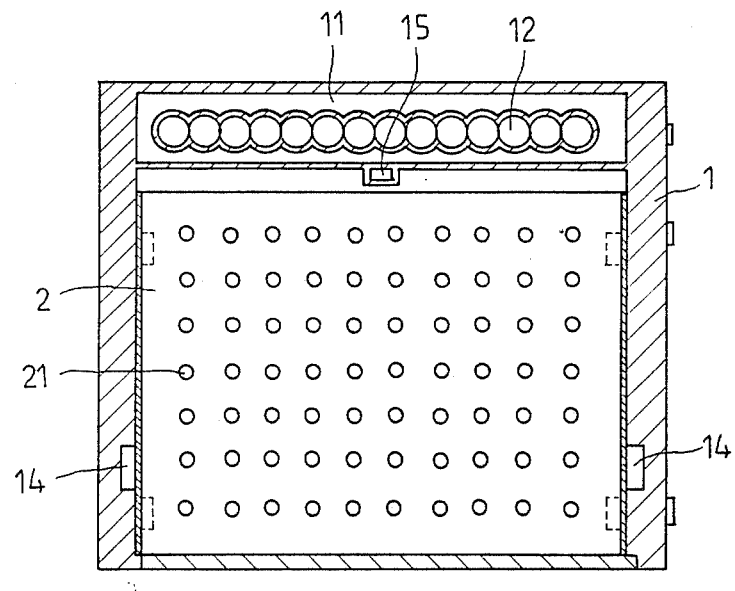
FIG. 3 is a sectional view taken along line B—B of FIG. 1.
Figure 4:
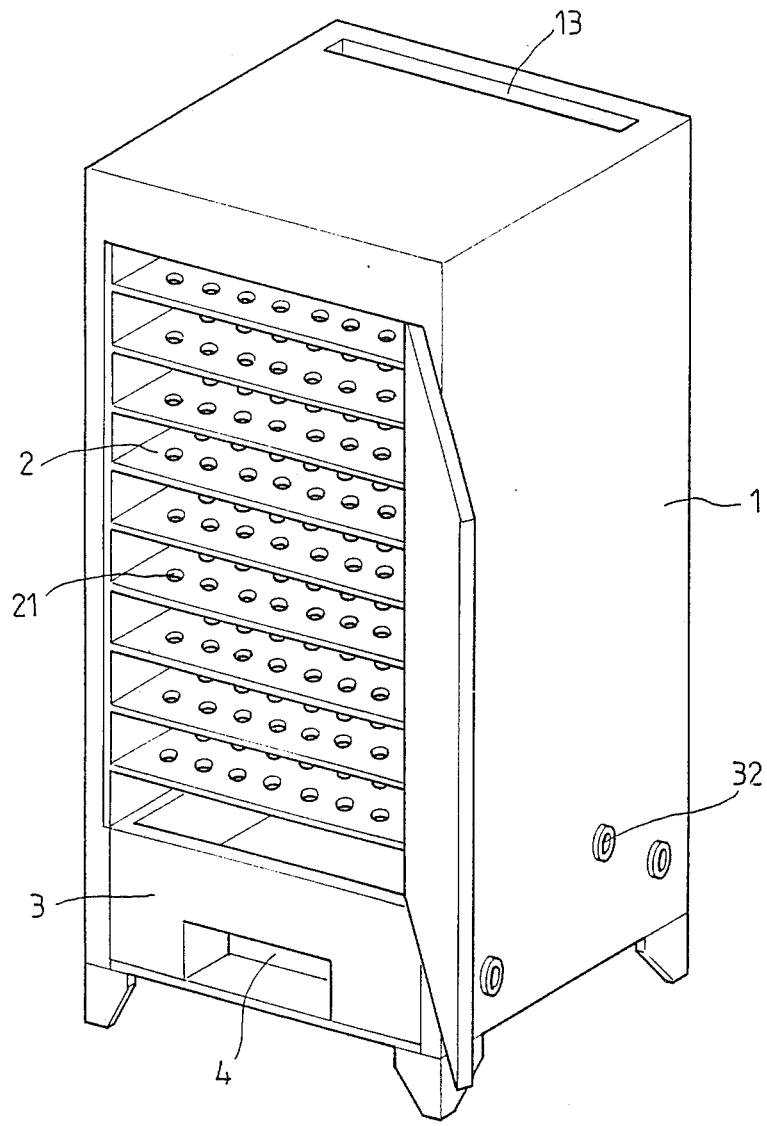
FIG. 4 is a perspective view of the steaming case.

The water tank 3 is located at the lower portion of the case 1 and has an open-top space for receiving water. Disposed within the water tank 3 is a float valve 31 the inlet of which extends to the outer side of the case 1 (as shown in FIG. 4) for supplying water therein. The outlet 33 of the float valve 31 is connected to the concealed lamina 11 mounted in the rear side of the case 1. As shown in FIGS. 2 and 3, the concealed lamina 11 comprises an exhaust pipe lamina 12 which is in the shape of a waving plate so as to increase the heat conducting capacity thereof. The exhaust pipe lamina 12 extends upwardly from the bottom of the water tank 3 to the exit 13 located on the top of the case 1. In accompanying with the auxiliary exhaust pipes 14 at both sides of the case 1, an exhaust system for the waste gas of the gas cooker 4 is established.

At the rear inner side of the case 1, there is a passage 15 the lower end of which is communicated with the water tank 3. The upper part of the passage 15 has an opening 16 communicated with the concealed lamina 11. By means of the water tank 3, the float valve 31, the concealed lamina 11, the opening 16 and the passage 16, a water supplying cyclic system is accomplished.

The gas cooker 4 is mounted below the water tank 3, so that the waste gas from the gas cooker 4 will not enter into the case 1. The waste gas is exhausted through the auxiliary exhaust pipes 14 at both sides of the case 1 and the exhaust pipe lamina 12 at the rear side of the case 1 to the exit 13 at the top of the case 1. Hence, the food in the case 1 will not be contaminated and when the exhaust gas passes through the exhaust pipe lamina 12, the waste gas will heat the surrounding water which will in turn warm up the inner wall of the case 1 thereby achieving the purpose of heat recovery.

In use, the gas cooker 4 first heats the water tank 3 to generate steam. Through the contact of the steam and the food on the lamina 12, the food will be heated or baked. It should be noted, however, that the conventional steaming case has no means for the heat recovery of the waste gas. Hence the steam will condense into liquid water when in contact with the wall of the conventional steaming case and the liquid water will drop down onto the food thereby damaging the appearance thereof. Whereas, the heat of the waste gas of the present invention is transmitted to the surrounding water which will in turn transmit the heat to the inner wall of the case 1. This design not only can prevent the steam from dropping downwards after being condensed, but also can fully utilize the heat of the steam and recover the heat of the waste gas.

As the water level in the water tank 3 is below the predetermined level, the float valve 31 will be opened and water will be fed therein. In the meantime, water will enter into the inlet 32 and then flow into the concealed lamina 11 via the outlet 33. When the water level in the lamin 11 is up to the opening 16, water will flow out to the pipe 15 via the opening 16 and then flow into the water tank 3. Consequently, the water level in the water tank 3 will rise and when the water level rises to the predetermined level, the float valve 31 will be closed. In short, the water level in the water tank and the lamina 11 will be maintained at a fixed level.

Although this invention has been described with a certain degree of particularity, it is understood that the present disclosure is made by way of example only and that numerous changes in the defail of construction and the combination and arrangement if parts may be resorted to from the scope and the spirit of the invention as hereinafterclaimed.

I claim:

1. A steaming case comprising:

a metal case having a room therein for receiving a plurality of laminas, each lamina being formed with a plurality of steam holes, an open-top water tank disposed at lower part of said case, and a gas cooker mounted below the water tank for heating the water therein;

characterized in that said case is provided at the rear side with a concealed lamina which has at its middle portion an exhaust pipe lamina in waving shape, said exhaust pipe lamina extending upwardly from bottom of the water tank to exit on top of the case, two auxiliary exhaust pipes adapted to two sides of the case thereby forming a heat recovery cyle, a passage in the rear inner side of the case with its lower end communicated with the water tank and its upper end communicated with the concealed lamina, a float valve having an inlet extending to the outer side of the case to connect a water supply and an outlet extending to the water tank via the concealed lamina, the opening and the passage; whereby when the water received in the water tank is below the predetermined level, the float valve will be opened and water will be fed therein, and the heat of the waste gas may be recovered thereby increasing the efficiency of the steaming case.

* * * * *